Patented May 6, 1947

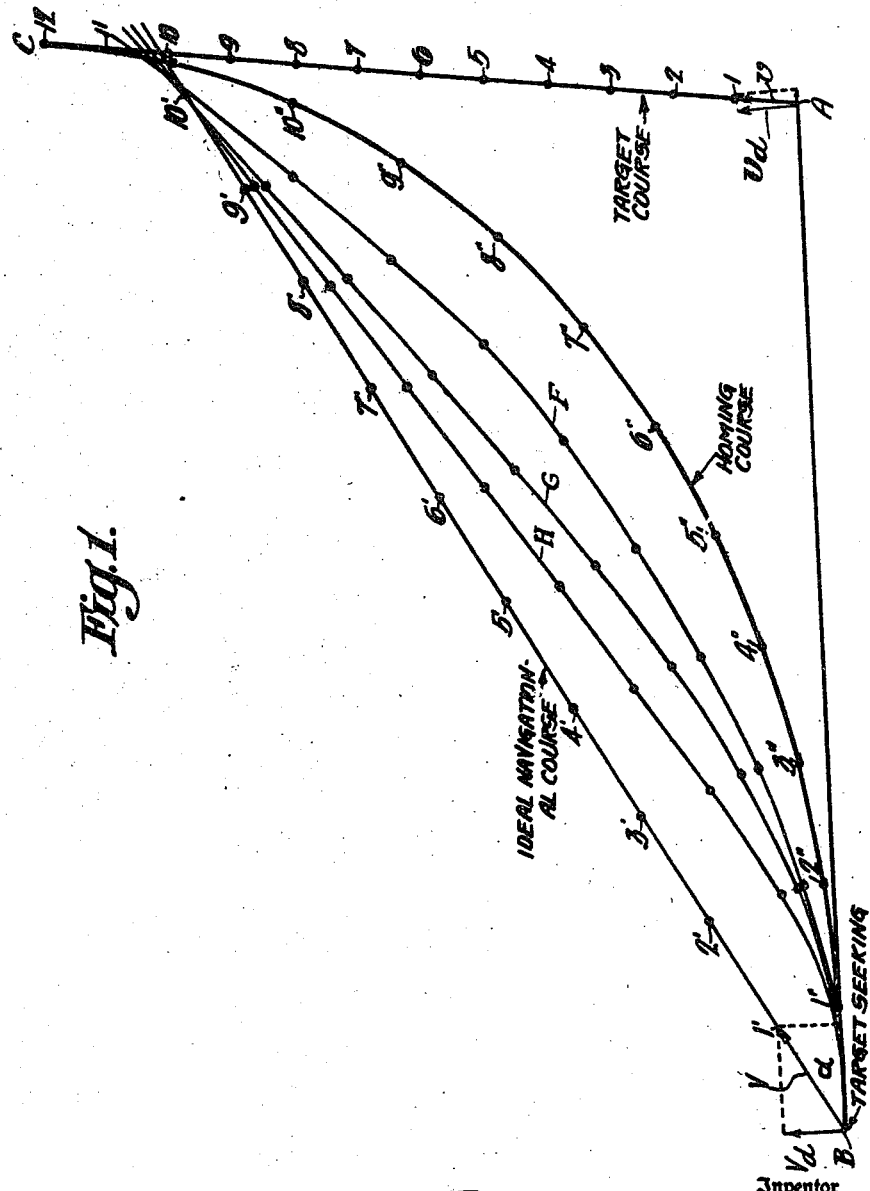

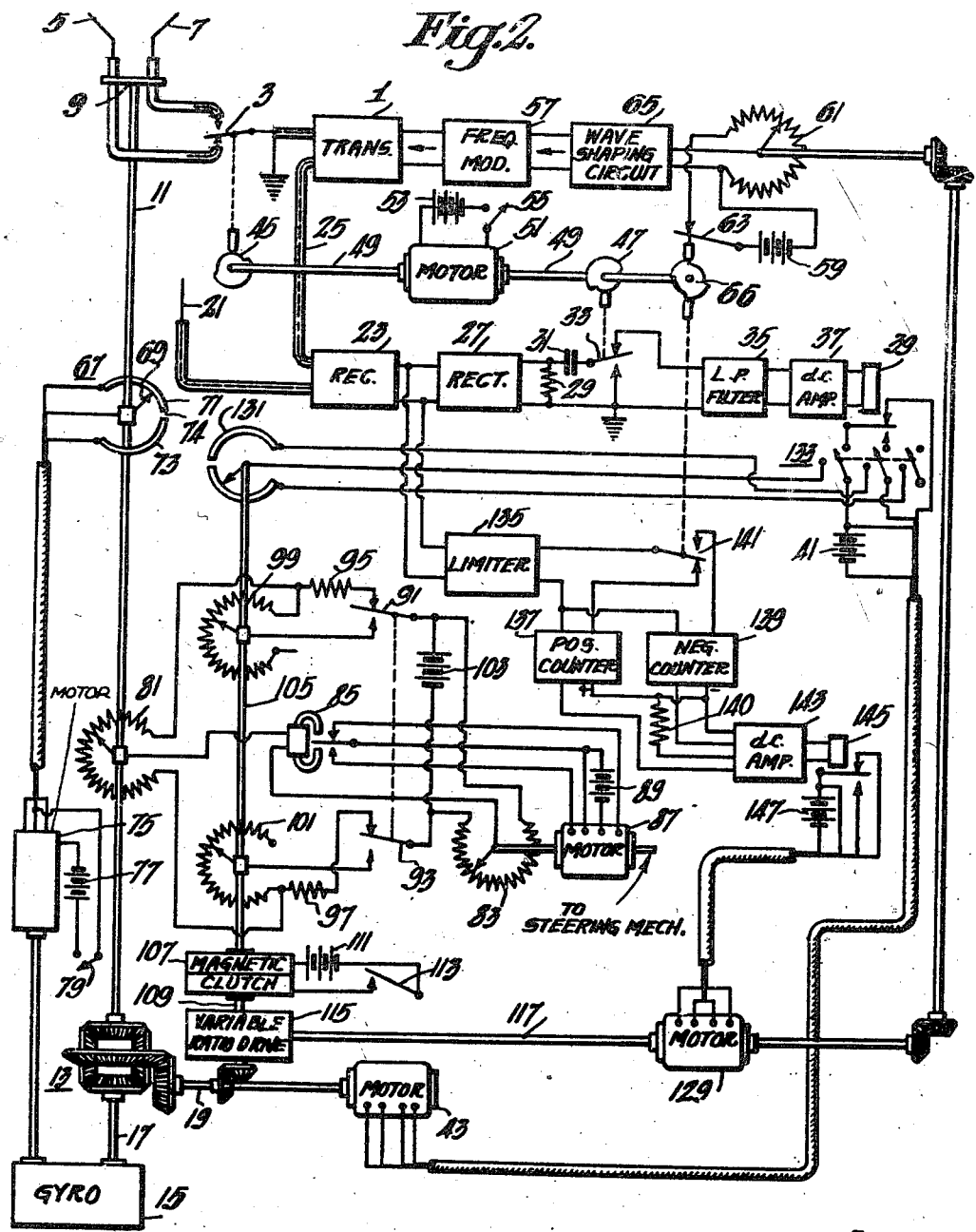

2,420,017

UNITED STATES PATENT OFFICE 2,420,017

REFLECTED WAVE NAVIGATION DEVICE

Royden C. Sanders, Jr., Hightstown, N. J., assignor to Radio Corporation of America, a corporation of Delaware Application May 23, 1944, Serial No. 537,021

9 Claims. (Cl. 250—1.54)

This invention relates to aircraft navigation and more particularly to improvements in the art of controlling automatically the direction of travel of an aircraft or other mobile craft to obtain approximately linear motion toward a selected target or other objective.

It is well known in prior art practice to direct automatically the travel of a mobile craft by means of a sighting device or radio direction finder which is maintained in alignment with the objective. If the direction of travel is continuously maintained directly toward the objective, a so-called "homing course" is followed. In the presence of drift caused by cross wind, or in case the objective is a target moving with a component transverse to the line of sight, the course will be a curved path. The term "line of sight" as used herein is intended to mean the line between the objective and the craft as determined in any manner, for example by means of radio direction finder apparatus.

A so-called "navigation course," or linear path of travel may be followed by maintaining the direction of motion of the craft at an angle with respect to the line of sight such that the transverse component caused by target motion or drift is compensated by an equal transverse component in the direction of flight of the craft being controlled. The necessary adjustment of direction of travel may be made readily if the magnitude of the transverse velocity component is known or can be calculated from available information. However, such information is frequently not available, particularly in the case of a moving target. As explained more fully hereinafter, a navigation course may be obtained without the necessity of knowing the transverse velocity, by maintaining a course such that the angle between the course and the line of sight remains constant. This may be accomplished by steering the craft in response to the sighting means so that as the line of sight changes through some angle $\Delta\alpha$, the direction of travel changes through an angle $n\Delta\alpha$, where $n$ is greater than 1. The factor $n$ is known as the navigation ratio. The greater the navigation ratio, the more nearly a true navigation course is approached; the less the navigation ratio, the more nearly a homing course. Owing to various practical considerations, the value of $n$ is usually limited to a range of 1½ to 6, depending upon the characteristics of the particular system. Ordinarily the navigation ratio $n$ is maintained constant.

The principal object of the instant invention is to provide an improved method of and means for navigation in which the aforementioned navigation ratio is controlled as a function of the predicted time which will be required to reach the objective. Another object is to provide a method of and means for controlling said navigation ratio automatically as a function of said time from objective. These and other objects will become apparent to those skilled in the art upon consideration of the following description, with reference to the accompanying drawings, of which:

Figure 1 is a geometrical diagram illustrating a typical homing course, an ideal navigation course, and drift corrected courses, and Figure 2 is a schematic diagram of an aircraft control system embodying the invention.

Referring to Figure 1, assume that a target, starting at a point A, moves with a speed $v$ along the course AC. Successive positions of the target at the ends of successive equal time intervals are indicated by the points 1, 2, 3, etc. A target seeking craft or seeker starts at the point B, moving with a speed V. In order for the seeker to intercept the target in the shortest possible time, the motion of the seeker must include a component $V_d$, perpendicular to the initial line of sight AB, which is equal to the component $v_d$ of the motion of the target perpendicular to the line AB. To meet this condition, the motion of the seeker is directed at an angle $$\alpha = \sin^{-1}\frac{v_d}{V}$$

with respect to the line of sight BA. Successive positions of the seeker along this ideal navigation course at the ends of successive equal time intervals are indicated by the points 1', 2', 3', etc. The intervals are equal to those corresponding to the respectively numbered points 1, 2, 3, etc. of the target course. It is to be noted that the angle $\alpha$ between the line of sight and the seeker course remains constant up to the point of interception, which occurs shortly after the end of the tenth interval.

Thus if the transverse velocity $v_d$ of the target with respect to the initial line of sight were known, and constant, there would be no difficulty in setting the ideal straight line interception course for the seeker. In practice, however, the velocity $v_d$ is not usually known or readily determinable; it is unlikely to remain constant, since a change in either the speed or the direction of the target motion will alter the magnitude of $v_d$. Furthermore, any drift of the seeker relative to the target must be added to or included in the quantity $v\alpha$. Therefore, continuous supervision of the seeker course in response to the target azimuth is necessary.

The simplest method of controlling the seeker course in response to target azimuth is to keep the seeker headed continuously along the line of sight to the target; the angle $\alpha$ between the seeker course and the line of sight is maintained at zero. The seeker will follow a homing course illustrated by the lowest curve of Figure 1, whereon successive positions of the seeker at the ends of successive equal time intervals are indicated by the points 1", 2", 3", etc. The line of sight, from the seeker at any point on the course to the target at the corresponding point on the course AC, is tangent to the curve, i. e., the angle $\alpha$ is zero.

As the seeker approaches the target, the course continuously increases in curvature, the seeker finally overtaking the target at approximately the end of the twelfth interval, under the conditions of Figure 1. The ratio $V/v$ of seeker speed to target speed is approximately 2 in Figure 1. If the ratio were less, the seeker would follow a course similar to that shown, but with less curvature at each corresponding point on the seeker course. The homing course thus has the theoretical disadvantage that the seeker can never reach the actual center of the target, and the much more practical disadvantage that the seeker course at the time of interception of the target is substantially curved. This places stringent speed of response requirements upon the seeker's automatic control apparatus even if the target has quite appreciable size, and makes it impossible for the seeker to drop bombs accurately if the homing course is used.

A course intermediate the homing course and the ideal navigation course may be obtained by controlling the direction of travel of the seeker in response to continuous or repeated intermittent measurement of the angle $\alpha$ so that as $\alpha$ changes by an amount $\Delta\alpha$, the seeker heading is changed by an amount $n\Delta\alpha$ in such direction as to oppose the change in $\alpha$. The courses represented by the curves designated F, G, and H in Figure 1 result from the use of values of 2, 3 and 5, respectively, for the navigation ratio $n$. In each case, the sight angle changes from its initial value of zero to a substantially constant finite value which is maintained to the point of interception. It is assumed that the initial value of $\alpha$ is zero both for simplicity in explanation and because it is preferable in practice to start on a homing course, with $\alpha=0$, to avoid a large initial correction which is not representative of the actual rate of change of sight angle and would require removal by correction in the opposite direction.

With $n=2$, (curve F) the course is perceptibly curved throughout its entire length, since under the conditions of Figure 1, there is insufficient time for substantially complete correction to be made. However, it is evident that the curvature decreases as the seeker approaches the target, which is intercepted near the end of the eleventh interval. When $n$ is increased to 3, (curve G), the seeker course is more sharply curved near the beginning, and becomes substantially linear after the sixth interval. Interception occurs near the middle of the eleventh interval. A further increase in the navigation ratio to $n=5$ provides still more rapid approach to linearity, and earlier interception, as shown by the curve H.

From the foregoing discussion, it might be inferred that a large navigation ratio is to be desired, so as to approach the ideal navigation course as nearly as possible. This is not necessarily true however, for the following reasons: 1. There is a finite minimum change in sight angle which can be detected. 2. Response to a change in sight angle cannot be entirely instantaneous, but requires a finite length of time. 3. Random variations in the apparent sight angle will occur for various reasons, particularly if radio direction finding apparatus is employed for "sighting." Assume that the minimum change in sight angle to which the seeker can respond is one degree; this is a typical value for automatic radio direction finder equipment. With a navigation ratio of 6, the smallest change in seeker course that can be made is 6 degrees. Suppose that the lag in the response of the steering mechanism is sufficient to allow a further change of sight angle during the time that correction is being made for the first one degree change. This further change will be greater than that which would have occurred if the correction had been made instantaneously, and may easily exceed one degree, particularly if the seeker is near the target, causing a further correction of 6 degrees to be introduced when as a matter of fact, none is called for. The net effect is thus that of increasing the navigation ratio momentarily to 12. An abrupt change of course may occur, causing a reversal of the direction of change of sight angle and, after a further period of delay, a large reverse correction of course. The seeker will tend to follow an undulating path rather than a single-curved, gradually straightening course.

With large navigation ratios, random momentary variation of apparent sight angle, resulting from multipath radio transmission, for example, may initiate disturbances of the above described type. When radio echo type object locating and direction determining equipment is used, variation in apparent sight angle becomes more troublesome as the target is approached because of the increase in angle that a finite target will present and the shift in the apparent point of reflection from the target. At relatively great distances from the target, strong reflections from other objects near the line of sight may cause the seeker to switch over to an unsought or undesired target. With large navigation ratio, the false drift correction introduced by momentary change of target will be large.

The choice of navigation ratio is thus a compromise between rapidity of correction to a linear course, and stability. Heretofore, the practice has been to select a value which appears to give the best results, maintaining the ratio constant throughout the run. The advantage of a large navigation ratio is chiefly in shortness of the time necessary to establish proper drift course. See curve H. The use of a large navigation ratio makes it possible to delay the use of navigation until the seeker is relatively close to the target, thus improving the selection of a desired target from a plurality of reflecting objects. After a linear path is obtained, reduction of the navigation ratio will not change the course. The disadvantage of a large navigation ratio is more apparent as the target is approached. By decreasing the navigation ratio as the time from target decreases, the advantage of rapidly setting a navigation course is obtained, without the disadvantage of unstable operation near the target.

The system of Figure 2 is a practical embodiment of the invention for controlling an aircraft or the like in response to F.-M. signals transmitted to a reflecting target.

A radio transmitter 1 is connected to a double throw switch 3, arranged to connect alternately the transmitter 1 to a pair of antennas 5 and 7. The antennas 5 and 7 which are directive and provide overlapping directive patterns, are mounted upon a supporting member 9. The support 9 is connected to a vertical shaft 11, which is connected through differential gearing 13 to a gyro stabilizer 15. The gyro 15 maintains its output shaft 17 at a constant angle in space, independently of motion of the craft upon which the equipment is mounted. The spider of the differential 13 is geared to a shaft 19. Rotation of the shaft 19 thus rotates the antennas 5 and 7 to an angular position in space corresponding to the position of the shaft 19.

A receiving antenna 21 is connected to a receiver 23 which includes a heterodyne detector. The receiver 23 is coupled to the transmitter 1 by suitable means, such as a transmission line 25. The output circuit of the receiver 23 is connected to a rectifier 27 which includes a load resistor 29. The upper end of the resistor 29 is coupled through a capacitor 31 to a double throw switch 33. The lower end of the resistor 29 and the lower fixed contact of the switch 33 are connected to ground. The upper fixed contact of the switch 33 is connected through a low pass filter 35 to a D.-C. amplifier 37. The output circuit of the D.-C. amplifier 37 includes a relay 39. The contacts of the relay 39 are connected between a battery 41 and a reversible motor 43 in such manner that when the current through the winding of the relay 39 is above a predetermined value, the motor 43 runs in one direction, and when the current is below the predetermined value, the motor 43 runs in the other direction. Preferably, said values differ somewhat so as to provide a "dead space," or range of current of intermediate value wherein the motor 43 is de-energized. The motor 43 is coupled to the input shaft 19 of the differential 13.

The switches 3 and 33 are operated in synchronism by means of cams 45 and 47 on the shaft 49 of a motor 51. The motor 51 is energized by a battery 53 connected thereto through a switch 55. The cams 45 and 47 are so positioned that the transmitter 1 is connected to the antenna 5 during the time that the switch 33 is in its upper position, and to the antenna 7 when the switch 33 is in its lower position.

The transmitter 1 is arranged to be cyclically varied in frequency by means of a frequency modulator 57, which may be of the vibratory variable capacitor type. The modulator 57 is energized by impulses produced by connecting periodically a battery 59 to a resistor 61 through a switch 63. The switch 63 is arranged to be operated by a cam 66 on the shaft 49. The cam 66 includes two lobes, so that the switch 63 is operated through a complete cycle during each period of connection of the transmitter 1 to each of the antennas 5 and 7. The resulting square wave voltage which appears across the resistor 61 is converted to triangular wave form by means of a wave shaping circuit 65, which may be an integrating circuit of the low pass filter type.

The operation of the system as thus far described is as follows: The switch 3 is cyclically driven from one position to the other, connecting the transmitter 1 alternately to the antennas 5 and 7. Signals are thus radiated alternately in two overlapping directive patterns. A reflecting object lying within the zone of radiation of either of antennas 5 and 7 will return a signal to the receiving antenna 21. This signal is combined in the heterodyne detector of the receiver 23 with a signal transmitted directly through the line 25 from the transmitter 1. Owing to the delay in the reflected signal with respect to the directly transmitted signal, the two inputs to the receiver 23 differ in instantaneous frequency by an average amount proportional to the distance of the reflecting object from the antennas. When the distance is decreasing due to motion of the seeker craft toward the target, the difference is larger when the transmitted frequency is decreasing, and smaller when the transmitted frequency is increasing, as a result of the Doppler increase in frequency of the received signal. The receiver 23 provides a beat output having a frequency equal to this difference. The amplitude of the output depends upon the strength of the signal returned to the antenna 21. If the reflecting object lies on the equi-signal line through the overlapping patterns of the antennas 5 and 7, the amplitude of the beat signal remains constant as the switch 3 is operated. If the reflecting object lies to the left of the equi-signal line, for example, a stronger signal will be returned to the antenna 21 when the switch 3 is in its lower position, and the beat signal will fluctuate in amplitude between two values which differ in accordance with the azimuth of the reflecting object with respect to the equi-signal line.

The beat voltage is rectified by the rectifier 27, providing a D.-C. voltage across the resistor 29 which varies in magnitude in accordance with the variations in amplitude of the beat voltage. When the switch 33 is in its lower position, the capacitor 31 is charged to a voltage corresponding to the strength of the signal reflected from the antenna 7. When the switch 33 is in its upper position, the voltage across the resistor 29 corresponds to the strength of the signal reflected from the antenna 5. This latter voltage is opposed to that across the capacitor 31, so that the net voltage applied to the filter 35 is proportional to the difference between the strengths of the two reflected signals. This difference voltage is smoothed by the filter 35 and applied to the D.-C. amplifier 37. The amplifier 37 is biased so that when the input thereto is of one polarity, the relay 39 is actuated to its upper position, and when the input is of the other polarity, the relay 39 drops to its lower position.

Accordingly, the motor 43 is energized to rotate the shaft 19 and hence the shaft 11, turning the antennas 5 and 7 to a position such that their signals are reflected with equal strengths to the antenna 21. Thereafter, any change in position of the reflecting object with respect to the equi-signal line will be compensated automatically, by operation of the motor 43 so as to maintain the equi-signal line directed toward the object.

Initial selection of the object upon which the bearing is to be maintained is accomplished by centering the antennas with respect to the longitudinal axis of the seeker craft, and steering manually toward the desired object or target to pick up a reflection from it. An antenna centering switch 67 is provided with a movable contact 69 coupled to the shaft 11 and two fixed contact sectors 71 and 73, with a small gap between them at the point 74 which is the position occupied by the movable contact 69 when the antennas are centered.

The switch 67 is connected between a reversible motor 75 and a power source 77, through a manually operable switch 79. The motor 75 is coupled to the gyroscope 15 in such manner that as the motor 75 rotates, the gyro is caused to precess, rotating the shaft 17. Assuming that the shaft 19 is held in a fixed position, closure of the switch 79 will cause the motor 75 to precess the gyro 15, rotating the shaft 11 to center the antennas 5 and 7.

The antenna shaft 11 is coupled to the steering mechanism by means of a servo system comprising a bridge circuit including two variable voltage dividers 81 and 83. The variable taps of the voltage dividers 81 and 83 constitute one pair of conjugate terminals of the bridge and are connected to a polarized relay 85. The contacts of the relay 85 are connected to control the energization of a reversible motor 87 from a battery 89. The shaft of the motor 87 is connected to the steering mechanism (not shown). Corresponding terminals of the voltage dividers 81 and 83 are connected together through switches 91 and 93, arranged to include selectively fixed resistors 95 and 97 or variable resistors 99 and 101 in the connections. A battery 103 is connected across the voltage divider 83. The variable resistors 99 and 101 are provided with a common shaft 105 which is coupled through a magnetic clutch 107 to a shaft 109. The clutch 107 is connected to a battery 111 through a switch 113. The shaft 109 is coupled through a variable ratio drive mechanism 115 to the shaft 19. The drive ratio between the shafts 19 and 109 is determined by the position of the control shaft 117, which is coupled to the reversible motor 129. Thus the position of the shaft of the motor 129 controls the ratio of the mechanism 115.

A centering switch 131, similar in construction to the switch 67, is coupled to the shaft 105 and connected to a two position switch 133. The switch 133 is connected to the contacts of the relay 39 and to the motor 43. When the switch 133 is thrown to one position, the motor 43 is subject to the control of the relay 39. When the switch 133 is thrown to its other position, the motor 43 rotates the shaft 105 to center the variable resistors 99 and 101, and maintain the shaft 19 in a fixed position while the antennas 5 and 7 are being centered.

The motor 129 is arranged to operate in accordance with the predicted time to reach the reflecting object as follows:

The output of the receiver 23 is applied through a limiter 135 to a pair of averaging cycle counters 137 and 139. A switch 141, arranged to be operated by the cam 66 is connected to the counters 137 and 139 to cause alternate operation thereof in synchronism with the operation of the switch 63. The counter 137 operates while the switch 63 is closed, and the transmitted frequency is increasing, and the counter 139 operates during the periods when the transmitted frequency is decreasing. Electronic switching means of the type disclosed in copending application Ser. No. 524,794, filed by R. C. Sanders, Jr., and W. R. Mercer on March 2, 1944, and entitled Radio bomb release system may be substituted for the switch 141 is desired. The counters 137 and 139 are provided with a common load resistor 140. The positive output terminal of the counter 137 and the negative output terminal of the counter 137 are connected to the upper end of the resistor 140, which is connected to the input terminals of a D.-C. amplifier 143. The return connections for the counter output circuits are connected separately to points in the amplifier 143 so as to provide linearity of counter operation, as described in detail in said copending application.

During increase of transmitted frequency, the Doppler shift caused by approach to the target, decreases the beat frequency by an amount proportional to the speed. Thus the output of the counter 137 is less than what it would be if there were no relative velocity between the mobile craft and the target. During decrease of transmitted frequency, the Doppler shift causes an increase in beat frequency and the counter 139 provides a larger output in accordance with the velocity. The average current through the resistor 140 is proportional to the difference of the outputs of the two counters. If the counter sensitivities were equal, the voltage across the resistor 140 would be proportional only to speed. However, the counter 137 is designed to have a greater sensitivity (volts per beat frequency cycle per second) than the counter 139. Thus the average voltage drop in the resistor 140 is proportional to $$kf_u - f_d$$

where $k$ is the ratio of the sensitivity of the counter 137 to that of the counter 139, $f_u$ is the beat frequency during increase of the transmitted frequency and $f_d$ is the beat frequency during decrease of the transmitted frequency.

The output of the amplifier 143 is connected to a relay 145 similar to the relay 39. The relay 145 is arranged to control the energization of the motor 129 from a battery 147. The shaft of the motor 129 is coupled to the voltage divider 61 which controls the amplitude of the square wave modulation signal. Thus the position of the shaft of the motor 129 controls the width of the band through which the frequency of the transmitter 1 is varied.

The beat frequency during increase of transmitted frequency is $$f_u = \frac{Sf_m d}{246} - \frac{2vf_c}{C} \text{ cycles per second}$$

where S is the band width in megacycles per second through which the transmitted frequency is varied, $f_m$ is the modulating frequency, $d$ is the distance of the seeker from the target, $v$ is the velocity of the seeker with respect to the target, $f_c$ is the average or carrier frequency of the transmitted signal and C is the velocity of wave propagation. The beat frequency during decrease in frequency of the transmitted signal is $$f_d = \frac{Sf_m d}{246} + \frac{2vf_c}{C} \text{ cycles per second}$$

The average voltage across the counter load resistor 140 is proportional to $$kf_u - f_d = (k-1)\frac{Sf_m d}{246} - (k+1)\frac{2vf_c}{C}$$

It is apparent that this voltage may be made zero by proper adjustment of the voltage divider 61, which controls the band width S. The motor 129 is controlled by the relay 145 in response to the output of the amplifier 143 to adjust the voltage divider 61 for this condition. Thus $$(k-1)\frac{Sf_m d}{246} = (k+1)\frac{2vf_c}{C}$$

and $$\frac{d}{v} = \frac{(k+1)\frac{2f_c}{C}}{(k-1)\frac{Sf_m}{246}}$$

$d/v$ is the distance of the seeker from the target divided by the rate of approach to the target and hence is the predicted time T which will be required to reach the target under present conditions. Since the quantities $k$, $f_c$, C and $f_m$ are constant, this may be rewritten as $$T = \frac{n}{S}$$

where $$n = \frac{(k+1)\frac{2f_c}{C}}{(k-1)\frac{f_m}{246}}$$

The voltage divider 61 is constructed with a reciprocal taper, that is the ratio of the output to the input over the operative portion of its range of adjustment is inversely proportional to the angular position of its control shaft. Thus, the position of the shaft of the motor 129 is continuously maintained at an angular position which is directly proportional to the time from target T.

The adjustment and operation of the system for homing is as follows:

The switches 91 and 93 are thrown to their upper positions, connecting the fixed resistors 95 and 97 in the bridge circuit. The switches 79 and 113 are closed and the switch 133 is operated to its lower position, connecting the centering switch 131 in the circuit of the motor 43. The motors 75 and 43 then operate to center the antennas 5 and 7 with respect to the longitudinal axis of the seeker craft. If the angular positions of the movable arms of the voltage dividers 81 and 83 do not coincide, the differential relay 85 is operated, energizing the motor 87 to drive the voltage divider 83 and the steering mechanism to their center positions. The craft is then steered manually toward the desired object, by superimposing manual control of the steering mechanism upon that provided by the motor 87. The switches 79 and 113 are then opened and the switch 133 is operated to connect the motor 43 to the relay 39. As long as the target remains upon the equi-signal line of the antennas 5 and 7, the motor 43 is deenergized. However, if the line of sight to the target changes, the motor 43 is energized accordingly, rotating the shaft 19 and thereby turning the shaft 11 to again direct the antennas toward the target, as described above. Rotation of the shaft 11 turns the voltage divider 81, unbalancing the bridge circuit and operating the relay 85, thus energizing the motor 87 to rotate its shaft to a position corresponding to that of the shaft 11. Rotation of the motor 87 controls the steering mechanism, altering the course of the craft to cause it to again travel toward the target.

To provide an interception or navigation course, the equipment is first operated as described above for homing. After a brief period of homing operation, the switches 91 and 93 are operated to their lower positions, substituting the variable resistors 99 and 101 for the resistors 95 and 97 in the bridge circuit. The switch 113 is simultaneously closed to engage the clutch 107. The motor 129 then operates as described above to adjust the drive ratio of the mechanism 115 to a value corresponding to the predicted time from the target. Upon the occurrence of any change in the bearing of the target, the motor 43 operates to restore the alignment of the antennas to the line of sight. At the same time as this adjustment is made, the shaft 105 is rotated, turning the voltage dividers 99 and 101 so as to increase the resistance in one arm of the bridge and decrease the resistance in the other arm. This shifts the balance point of the bridge in the same direction as the line of sight correction, causing the motor 87 to rotate further than the shaft 11 by an amount depending upon the rotation of the shaft 105. The ratio of the angle through which the shaft of the motor 87 rotates to that through which the shaft 11 rotates is the navigation ratio, and is controlled by the motor 129. The proportionality of the navigation ratio to the time T may be controlled by adjustment of the voltage of the battery 147 or by means of change gearing, not shown, interposed between the drive 115 and the shaft 109.

At the beginning of the run, when the seeker craft is relatively far from the target, after a brief period of homing, the motor 129 will be at a position near the clockwise limit of its motion, providing a high navigation ratio. As the distance to the target decreases, the motor 129 reduces the drive ratio, providing a correspondingly decreasing navigation ratio.

The seeker will tend to attain a relatively linear course similar to the curve H of Figure 1. The subsequent reduction of the navigation ratio will minimize the tendency to deviate from this course as the target is approached.

Although the invention has been described with reference to a radio locator system of the F.-M. reflection type, it will be evident that it may be embodied in any system wherein a mobile craft is steered in response to the line of sight of the objective, by controlling the navigation ratio as a function of the distance.

I claim as my invention:

1. The method of steering a mobile craft toward a predetermined objective, including the steps of substantially continuously determining the azimuth of said objective with respect to the line of travel of said craft, changing the direction of travel of said craft in response to changes occurring in said azimuth but to extents which are multiples of said changes in azimuth by a factor designated as the navigation ratio, substantially continuously determining the predicted time required for said craft to arrive at said objective, and varying the value of said navigation ratio directly as said predicted time.

2. The method of steering a mobile craft toward a predetermined objective, including the steps of varying the direction of travel of said craft in response to variation in the azimuth of said object with respect to the line of travel of said craft, but to an extent which is greater than said variation in azimuth by a factor designated as the navigation ratio, substantially continuously determining the predicted time required for said craft to reach said objective, and varying the value of said navigation ratio as a predetermined function of said predicted time.

3. A target seeking system for mobile craft, including target azimuth responsive steering means, variable ratio drive mechanism connected to said azimuth responsive means to control the extent of the response thereto to a given change of azimuth, and means responsive to the quotient of target distance and rate of change of target distance to control the ratio of said drive mechanism.

4. In a target azimuth responsive steering system for mobile craft, wherein variations in azimuth cause corresponding variations in steering which are larger than said target azimuth variations by a navigation ratio, the system for controlling the value of said navigation ratio including a time from target predicting device, a variable ratio drive system interposed in said steering system, and means for controlling the ratio of said variable ratio drive system in response to said time predicting device.

5. A target azimuth responsive steering system for mobile craft, including means for transmitting a frequency modulated signal toward a selected target, means for receiving said signal after reflection by said target and for combining said reflected signal with a signal received directly from said transmitter to provide a beat signal having an average frequency which bears a predetermined relationship to the distance of said target from said craft, and a range of frequency variation which bears a predetermined relationship to the speed of said craft with respect to said target, said transmitter means and said receiver means each including an antenna, means for cyclically altering the directivity of at least one of said antennas to provide two overlapping directive patterns intersecting in an equi-signal line, whereby said beat signal is varied in amplitude in accordance with deviation of said equi-signal line from the azimuth of said target, means for establishing a reference line of fixed azimuth in space, means responsive to said variations in amplitude of said beat signal for varying the angular position of said antenna whose directivity is cyclically altered to vary correspondingly the angular position of said equi-signal line with respect to said reference line, whereby said equi-signal line is maintained in a direction corresponding to said target azimuth, a steering motor, means responsive to variation in the position of said equi-signal line with respect to the position of said reference line to vary in a corresponding direction the angular position of the shaft of said steering motor through an angle which is related to the angle of variation of said equi-signal line by a factor designated as the navigation ratio, and means responsive to said beat signal to control the magnitude of said navigation ratio as a predetermined function of the predicted time required for said craft to arrive at said target.

6. A target azimuth responsive steering system for mobile craft, including means for transmitting a frequency modulated signal toward a selected target, means for receiving said signal after reflection by said target and for combining said reflected signal with a signal received directly from said transmitter to provide a beat signal having an average frequency which bears a predetermined relationship to the distance of said target from said craft, and a range of frequency variation which bears a predetermined relationship to the speed of said craft with respect to said target, said transmitter means and said receiver means each including an antenna, means for cyclically altering the directivity of at least one of said antennas to provide two overlapping directive patterns intersecting an equi-signal line, whereby said beat signal is varied in amplitude in accordance with deviation of said equi-signal line from the azimuth of said target, means for establishing a reference line of fixed azimuth in space, an antenna positioning motor coupled to said antenna for varying the angular position of said antenna to vary correspondingly the angular position of said equi-signal line with respect to said reference line, control means for said motor responsive to said variations in amplitude of said beat signal to control the angular position of said antenna whose directivity is cyclically altered to maintain said equi-signal line in a direction corresponding to said target azimuth, a steering motor, control means for said steering motor responsive to variation in the position of said antenna positioning motor to vary in a corresponding direction the angular position of the shaft of said steering motor through an angle which is related to the angle of variation of said equi-signal line by a factor designated as the navigation ratio, and means responsive to the frequency of said beat signal to control the magnitude of said navigation ratio as a predetermined ratio of the predicted time required for said craft to arrive at said target.

7. A target azimuth responsive steering system for mobile craft, including means for transmitting a frequency modulated signal toward a selected target, means for receiving said signal after reflection by said target and for combining said reflected signal with a signal received directly from said transmitter to provide a beat signal having an average frequency which bears a predetermined relationship to the distance of said target from said craft, and a range of frequency variation which bears a predetermined relationship to the speed of said craft with respect to said target, said transmitter means and said receiver means each including an antenna, means for cyclically altering the directivity of at least one of said antennas to provide alternately two overlapping directive patterns intersecting an equi-signal line, whereby said beat signal is varied in amplitude in accordance with deviation of said equi-signal line from the azimuth of said target, gyroscope means for establishing a reference line of fixed azimuth in space, an antenna positioning motor for varying the angular position of said antenna whose directivity is cyclically altered to vary correspondingly the angular position of said equi-signal line with respect to said reference line, control means for said antenna positioning motor responsive to said variations in amplitude of said beat signal to control the angular position of said antenna to maintain said equi-signal line in a direction corresponding to said target azimuth, a steering motor, control means for said steering motor responsive to variation in the position of said antenna positioning motor to vary in a corresponding direction the angular position of the shaft of said steering motor, and means responsive to the frequency of said beat signal to control the extent of the response of said steering motor control means to said variation in position of said antenna positioning motor as a predetermined function of the ratio of said average frequency of said beat signal to said range of frequency variation of said beat signal.

8. A target azimuth responsive steering system for mobile craft including a time from target predicting system, a target azimuth determining system, a servo system responsive to said azimuth determining system to steer said craft, and means responsive to said time from target predicting system to control the extent of the response of said servo system to said azimuth determining system.

9. A target azimuth responsive steering system for mobile craft including a time from target predicting system of the radio reflection type, said system including directional antenna means and servo means responsive to the amplitude of signals reflected from a selected target to orient said antenna means in a predetermined angular relationship with the line of sight of said target, servo means responsive to said antenna orienting servo means to steer said craft, and variable ratio drive means responsive to said time from target predicting means to control the extent of the response of said steering servo means to said antenna orienting means as a predetermined function of said predicted time.

ROYDEN C. SANDERS, JR.

REFERENCES CITED

The following references are of record in the file of this patent:

UNITED STATES PATENTS

| Number | Name | Date |
| --- | --- | --- |
| 2,176,469 | Moueix | Oct. 17, 1939 |